(12) United States Patent
Wei

(10) Patent No.: US 10,139,711 B1
(45) Date of Patent: Nov. 27, 2018

(54) TELESCOPIC STABILIZER AND CONTROL METHOD THEREOF

(71) Applicant: Chengyun Wei, Guangxi (CN)

(72) Inventor: Chengyun Wei, Guangxi (CN)

(*) Notice: Subject to any disclaimer, the term of this patent is extended or adjusted under 35 U.S.C. 154(b) by 0 days.

(21) Appl. No.: 15/856,011

(22) Filed: Dec. 27, 2017

(30) Foreign Application Priority Data

Sep. 29, 2017 (CN) .......................... 2017 1 0909229

(51) Int. Cl.
*G03B 17/00* (2006.01)
*G03B 17/56* (2006.01)
*F16M 13/04* (2006.01)

(52) U.S. Cl.
CPC ........... *G03B 17/563* (2013.01); *F16M 13/04* (2013.01); *G03B 17/561* (2013.01)

(58) Field of Classification Search
USPC ......................................................... 396/421
See application file for complete search history.

(56) References Cited

U.S. PATENT DOCUMENTS

| | | | | |
|---|---|---|---|---|
| 9,170,473 | B1* | 10/2015 | Li | F16M 11/28 |
| 9,906,711 | B2* | 2/2018 | Chu | H04N 5/23219 |
| 2002/0141812 | A1* | 10/2002 | Edelen | F16B 7/14 |
| | | | | 403/109.1 |
| 2009/0003822 | A1* | 1/2009 | Tyner | F16M 11/32 |
| | | | | 396/428 |
| 2013/0010186 | A1* | 1/2013 | Scarola | F16M 11/28 |
| | | | | 348/376 |
| 2016/0091779 | A1* | 3/2016 | Jodoin | G03B 17/561 |
| | | | | 396/428 |
| 2016/0246162 | A1* | 8/2016 | Niemeyer | F16M 11/18 |
| 2016/0290556 | A1* | 10/2016 | Choi | F16M 13/022 |
| 2017/0037995 | A1* | 2/2017 | Pan | F16M 11/18 |
| 2017/0064176 | A1* | 3/2017 | Kim | F16M 11/18 |
| 2017/0227162 | A1* | 8/2017 | Saika | F16M 13/02 |
| 2018/0009099 | A1* | 1/2018 | Resh | B25G 3/18 |

* cited by examiner

Primary Examiner — Rodney E Fuller

(57) ABSTRACT

The stabilizer comprises a handle, a telescopic device, a clamping portion, a first connecting rod, a second connecting rod, and a third connecting rod, wherein the telescopic device has two ends respectively connected with the handle and a first driving mechanism for driving the clamping portion to perform yawing movement, the first connecting rod has two ends respectively connected with the first driving mechanism and a third driving mechanism for driving the clamping portion to perform rolling movement, the third connecting rod has two ends respectively connected with the third driving mechanism and a second driving mechanism for driving the clamping portion to perform pitching movement, and the second driving mechanism is connected with the clamping portion by the second connecting rod. A control method of the stabilizer is further provided. The present invention provides a rational design and a compact structure.

9 Claims, 3 Drawing Sheets

TELESCOPIC STABILIZER AND CONTROL METHOD THEREOF

CROSS-REFERENCE TO PRIOR APPLICATION

This application claims the benefit of Chinese Patent Application No. 201710909229.0 filed on Sep. 29, 2017, the contents of which are incorporated herein by reference.

FIELD OF THE INVENTION

The present invention relates to the technical field of photographic equipment, more particularly to a telescopic stabilizer and a control method thereof.

BACKGROUND OF THE INVENTION

The stabilizer is used for fixing a target object and adjusting its position (e.g. the orientation, the rolling movement and the pitching movement), and for stabilizing it at a determined position, so as to achieve a stable and smooth multi-angle shooting. Now, the target objects include mobile phones, video cameras and photo cameras.

Existing stabilizers available in the market usually comprise a short handle directly connected with the rotation mechanism. If the user, or anyone else, wants to take a photo, he has to ask someone for help, otherwise the user has to stretch out his arm to take a photo for himself. If the user's arm is not long enough, the images that he can capture are very limited. Therefore, it is inconvenient to use existing stabilizers to perform long-distance shooting or self shooting.

SUMMARY OF THE INVENTION

Aiming at these technical problems in the art, the object of the present invention is to provide a telescopic stabilizer and a control method thereof, to provide a stabilizer which is capable of being extended and contracted and allows for an adjustment of the distance between a target object and a shooting subject as needed, whereby a stable shooting can be achieved by means of the extended or contracted stabilizer.

In order to achieve the above goal, the present invention provides a telescopic stabilizer, comprising a handle, a telescopic device, a clamping portion, a first connecting rod, a second connecting rod, and a third connecting rod, wherein the telescopic device has two ends respectively connected with the handle and a first driving mechanism used for driving the clamping portion to perform yawing movement, the first connecting rod has two ends respectively connected with the first driving mechanism and a third driving mechanism used for driving the clamping portion to perform rolling movement, the third connecting rod has two ends respectively connected with the third driving mechanism and a second driving mechanism used for driving the clamping portion to perform pitching movement, and the second driving mechanism is connected with the clamping portion by the second connecting rod.

Preferably, the telescopic device may comprise at least two telescopic rods which are inserted, sleeved and connected successively, wherein an outermost telescopic rod is fixedly connected with the handle, and an innermost telescopic rod is fixedly connected with the first driving mechanism.

Preferably, the telescopic device may comprise a first telescopic rod, a second telescopic rod, a third telescopic rod, a fourth telescopic rod, and a fifth telescopic rod, which are successively inserted and sleeved, wherein the first telescopic rod has one end fixedly connected with the first driving mechanism, and the fifth telescopic rod is inserted inside the handle.

Preferably, two adjacent telescopic rods may be connected by a stop collar, wherein one of the two adjacent telescopic rods is provided with a locking hole, a protrusion fitted with the locking hole and capable of being engaged with the locking hole is arranged at a lower part of the stop collar, and a lower part of the other telescopic rod is fixedly sleeved at the stop collar.

Preferably, the first driving mechanism may comprise a first motor and a first motor control circuit which are electrically connected, the second driving mechanism may comprise a second motor and a second motor control circuit which are electrically connected, and the third driving mechanism may comprise a third motor and a third motor control circuit which are electrically connected.

Preferably, the handle may be arranged with a button panel, on which a four-directional control key is arranged, and a four-directional control key circuit and a Bluetooth® module may be arranged inside the button panel, wherein the four-directional control key is electrically connected with the four-directional control key circuit, the four-directional control key circuit is electrically connected with the Bluetooth® module, and the Bluetooth® module is electrically connected with the first motor control circuit and the third motor control circuit respectively.

Preferably, the clamping portion may be arranged with an inertial measurement unit electrically connected with the second motor control circuit.

Preferably, the inside of the handle may be divided into a first cavity and a second cavity, between which a partition plate is arranged.

Preferably, the outermost telescopic rod may be inserted and sleeved inside the first cavity, and a battery compartment and a battery disposed inside the battery compartment may be arranged inside the second cavity.

Preferably, a fixing device for fixing an end of the outermost telescopic rod may be arranged on a side of the partition plate facing the first cavity.

The present invention further provides a control method of a telescopic stabilizer, comprising technical solutions as follows.

S1. Collecting direction control signals of a four-directional control key in real time by means of a four-directional control key circuit; and converting the direction control signals into direction control input signals that can be processed by the four-directional control key circuit;

S2. Sending the direction control input signals to a Bluetooth® module by means of the four-directional control key circuit; by means of the Bluetooth® module, calculating command signals for changing a movement angle and a movement trend of a first motor and a third motor on the basis of the collected direction control input signals, and sending the command signals for changing a movement angle and a movement trend of a first motor and a third motor to a first motor control circuit and a third motor control circuit;

S3. Processing the control signals sent from the Bluetooth® module and outputting control signals of the first motor to control yawing movement of the first motor by means of the first motor control circuit, and processing the control signals sent from the Bluetooth® module and outputting control signals of the third motor to control rolling movement of the third motor by means of the third motor control circuit;

S4. By means of the inertial measurement unit, detecting angular velocity information and acceleration information of the target object after a change of motion states of the first motor and the third motor, and resolving the detected angular velocity information and acceleration information to obtain position information of the target object;

S5. Sending the position information of the target object to a second motor control circuit by means of the inertial measurement unit, processing the received position information by means of the second motor control circuit to obtain a control increment of the angular velocity and acceleration of the target object;

S6. Feeding back the control increment of the angular velocity and acceleration of the target object by means of the second motor control circuit, to enable a control of pitching movement of the second motor.

The telescopic stabilizer and the control method thereof according to embodiments of the present invention have advantages as follows.

In the embodiment, with the telescopic device arranged between the first driving mechanism and the handle, the problem of an inconvenient use of existing stabilizers having short handles and applied to self shooting or long-distance shooting is overcome.

Furthermore, the four-directional control key circuit is provided for receiving signals of the four-directional control key, the Bluetooth® module is provided for receiving signals of the four-directional control key circuit, the first motor control circuit and the third motor control circuit are provided for processing the signals received from the Bluetooth® module and outputting signals to the first motor and the third motor so as to control the motion states of the first motor and the third motor. As the motion states of the first motor and the third motor change, the motion state of the target object positioned on the clamping portion change. The clamping portion is arranged with an inertial measurement unit for collecting signals of the target object. The second motor control circuit is provided for processing the signals of the inertial measurement unit and outputting signals to the second motor so as to control the motion state of the second motor. With the above mentioned configurations, a control of the direction and the stability of the stabilizer can be achieved, and a stable shooting can be provided by the extended or contracted stabilizer

In the figures: 1. handle; 11. first cavity; 12. second cavity; 13. partition plate; 14. fixing device; 2. telescopic device; 21. first telescopic rod; 22. second telescopic rod; 23. third telescopic rod; 24. fourth telescopic rod; 25. fifth telescopic rod; 26. stop collar; 27. protrusion; 28. locking hole; 29. arc-shaped press-on piece; 210. sliding groove; 3. clamping portion; 31. clamping piece; 32. clamping plate; 33. inertial measurement unit; 4. first driving mechanism; 41. first motor; 42. first motor control circuit; 5. second driving mechanism; 51. second motor; 52. second motor control circuit; 6. third driving mechanism; 61. third motor; 62. third motor control circuit; 7. first connecting rod; 8. second connecting rod; 9. third connecting rod; 100. button panel; 101. four-directional control key; 102. functional key; 103. camera button; 104. four-directional control key circuit; 105. Bluetooth® module.

DETAILED DESCRIPTION OF ILLUSTRATED EMBODIMENTS

The examples of the present invention will be further explained below in detail with reference to figures and embodiments. The embodiments are illustrative only and are not intended to limit the scope of the invention in any form.

Figure 1:
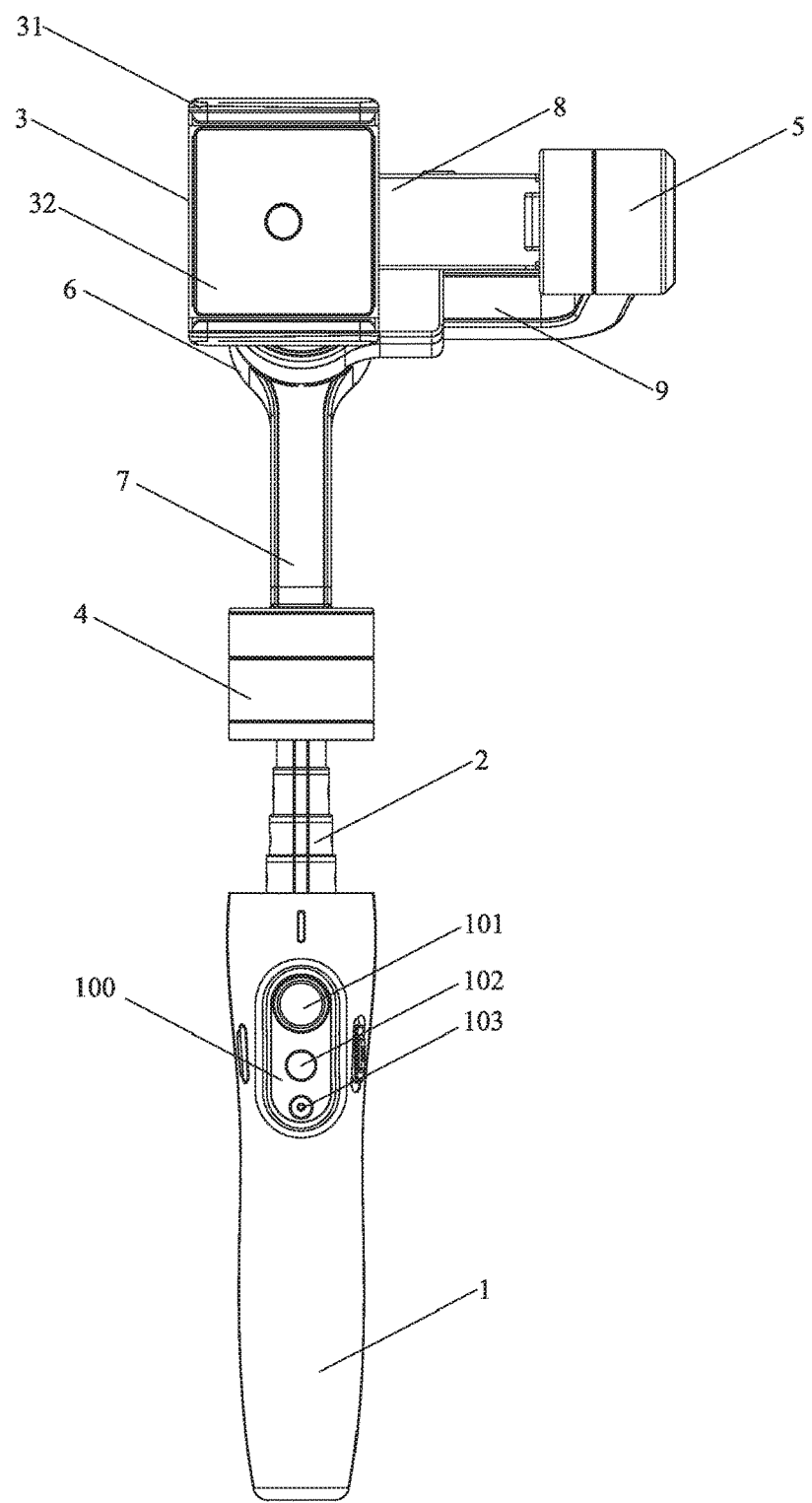
FIG. 1 is a schematic drawing illustrating an overall structure of a telescopic stabilizer according to an embodiment of the present invention.

Referring to FIG. 1, a telescopic stabilizer is provided in a preferred embodiment of the present invention, which comprises a handle 1, a telescopic device 2, a clamping portion 3, a first connecting rod 7, a second connecting rod 8, and a third connecting rod 9, wherein the telescopic device 2 has two ends respectively connected with the handle 1 and a first driving mechanism 4 which is used for driving the clamping portion 3 to perform yawing movement, the first connecting rod 7 has two ends respectively connected with the first driving mechanism 4 and a third driving mechanism 6 which is used for driving the clamping portion 3 to perform rolling movement, the third connecting rod 9 has two ends respectively connected with the third driving mechanism 6 and a second driving mechanism 5 which is used for driving the clamping portion 3 to perform pitching movement, and the second driving mechanism 5 is connected with the clamping portion 3 by the second connecting rod 8.

With the above-mentioned configuration, the telescopic device 2 is arranged between the first driving mechanism 4 and the handle 1. Due to the telescopic device 2, the stabilizer is capable of moving in the directions along which the telescopic device 2 stretches out and draws back, so as to allow a target object to be positioned at an optimum distance from the shooting subject to perform shooting, thereby solving the problem of an inconvenient use of existing stabilizers with short handles when they are applied to self shooting, long-distance shooting, etc. The first driving mechanism 4 is connected with the third driving mechanism 6 by the first connecting rod 7, such that the third driving mechanism 6 can be rotated along with the first driving mechanism 4 when the first driving mechanism 4 is rotated. The second driving mechanism 5 is connected with the third driving mechanism 6 by the third connecting rod 9, such that the second driving mechanism 5 can be rotated along with the third driving mechanism 6 when the third driving mechanism 6 is rotated. Herein, the second connecting rod 8 and the third connecting rod 9 are L-shaped connecting rods. Due to the connected driving mechanisms, the target object positioned on the clamping portion 3 can be driven to rotate in the space to perform multi-angle shooting.

Referring to FIGS. 1, 2, 3 and 4, the telescopic device 2 in the present embodiment comprises a plurality of telescopic rods which are inserted, sleeved and connected successively. The outermost telescopic rod is fixedly connected with the handle 1, and the innermost telescopic rod is fixedly connected with the first driving mechanism 4. With the configuration of the plurality of telescopic rods, the length of the telescopic rods can be freely adjusted according to the position of the target object relative to the shooting subject, so as to achieve a good photographing effect.

Two adjacent telescopic rods are connected by a stop collar 26. One of the two adjacent telescopic rods is provided with a locking hole 28. The stop collar 26 is arranged at its lower part with a protrusion 27 which is fitted with the locking hole 28 and capable of being engaged with the locking hole 28. The protrusion 27 is a protrusion of cylinder type. The lower part of the other telescopic rod is sleeved at the stop collar 26. Each of the telescopic rods is arranged at its lower part with an arc-shaped press-on piece 29, and the arc-shaped press-on piece 29 is disposed symmetrically on both sides of each telescopic rod. With the configuration of the arc-shaped press-on piece 29, the stop collar 26 may apply a uniform locking force to the telescopic rod, whereby the reliability and stability of the stop collar 26 are improved. The protrusion 27 fitted with the locking hole 28 has one end connected with a resilient member. The resilient member may be a spring. In the case that an extension of the telescopic device 2 is required, the telescopic rod positioned inside can be stretched out under external force. At this point, the spring which is in an extended state can be compressed and get into a compressed state. When the interior telescopic rod is stretched out to reach a maximal length, the protrusion 27 is engaged with the locking hole 28 and is exposed outside the locking hole 28. At this point, the spring is in an extended state, and the telescopic rod is in a fixed state. In the case that a contraction of the telescopic device 2 is required, the interior telescopic rod can be drawn back inwards under external force. At this point, the spring which is in an extended state can be compressed and get into a compressed state. When the interior telescopic rod is drawn back to the retracted position at the end, the whole telescopic device 2 is in a contracted state.

Referring to FIGS. 1, 2, 3 and 4, the telescopic device 2 in the present embodiment may be provided as more than two inserted, sleeved and connected telescopic rods according to the practical needs. The telescopic device 2 of the present invention may comprise five telescopic rods which are successively inserted and sleeved, i.e. a first telescopic rod 21, a second telescopic rod 22, a third telescopic rod 23, a fourth telescopic rod 24, and a fifth telescopic rod 25. Herein, the diameters of the first telescopic rod 21, the second telescopic rod 22, the third telescopic rod 23, the fourth telescopic rod 24 and the fifth telescopic rod 25 increase one by one. An upper end and a lower end of the second telescopic rod 22 are respectively connected with a lower end of the first telescopic rod 21 and an upper end of the third telescopic rod 23, a lower end of the third telescopic rod 23 is connected with an upper end of the fourth telescopic rod 24, and a lower end of the fourth telescopic rod 24 is connected with an upper end of the fifth telescopic rod 25. One end of the first telescopic rod 21 is connected with the first driving mechanism 4, and the fifth telescopic rod 25 is inserted inside the handle 1. The user may freely perform the extension and the contraction as needed, so as to adjust the total length of the stabilizer and the distance between the target object and the shooting subject.

In the present embodiment, a sliding groove 210 is correspondingly arranged on an outer circumferential surface of each telescopic rod in the extension or contraction direction, as shown in FIGS. 1, 2, 3 and 4. Due to the sliding groove 210, the first telescopic rod 21 can be inserted and sleeved in the second telescopic rod 22, the second telescopic rod 22 can be inserted and sleeved in the third telescopic rod 23, the third telescopic rod 23 can be inserted and sleeved in the fourth telescopic rod 24, and the fourth telescopic rod 24 can be inserted and sleeved in the fifth telescopic rod 25, thereby facilitating the extension and the contraction of the telescopic device 2.

Figure 2:
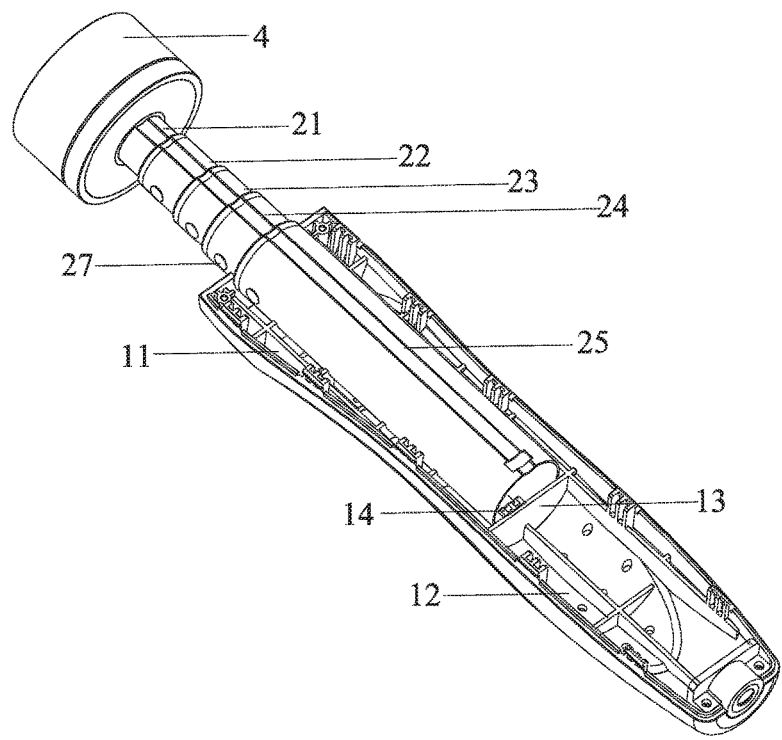
FIG. 2 is a schematic drawing illustrating a partial structure of a telescopic stabilizer according to an embodiment of the present invention.
Figure 3:
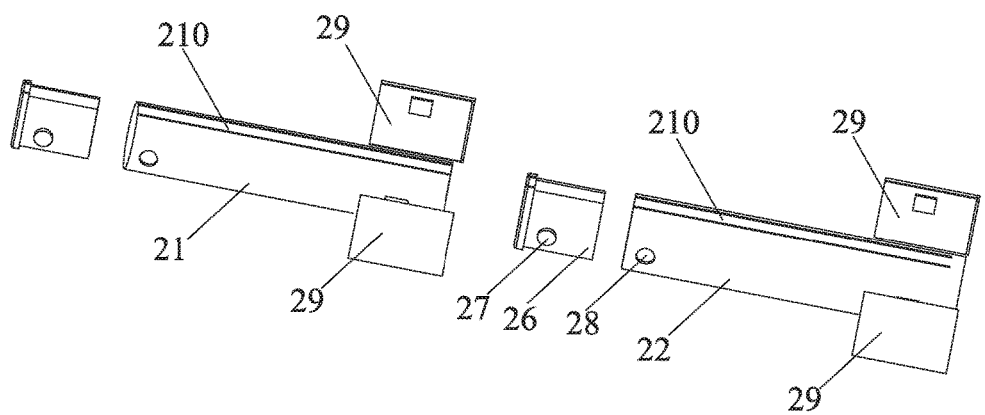
FIG. 3 is an exploded view of a telescopic device of a telescopic stabilizer according to an embodiment of the present invention.
Figure 4:
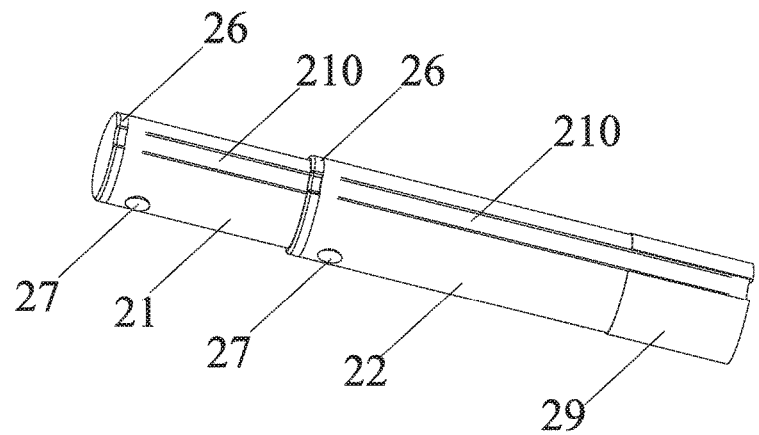
FIG. 4 is a schematic drawing of a telescopic device of a telescopic stabilizer according to an embodiment of the present invention.

Referring to FIGS. 1 and 2, the first driving mechanism 4 in the present embodiment comprises a first motor 41 and a first motor control circuit 42 which are electrically connected. Herein, the first motor 41 is connected with a first rotating shaft, and a motion state of the first motor 41 is controlled by the first motor control circuit 42. As the first rotating shaft is driven to rotate by the first motor 41, the clamping portion 3 is driven to perform yawing movement in the space. The second driving mechanism 5 comprises a second motor 51 and a second motor control circuit 52 which are electrically connected. Herein, the second motor 51 is connected with a second rotating shaft, and a motion state of the second motor 51 is controlled by the second motor control circuit 52. As the second rotating shaft is driven to rotate by the second motor 51, the clamping portion 3 is driven to perform pitching movement in the space. The third driving mechanism 6 comprises a third motor 61 and a third motor control circuit 62 which are electrically connected. Herein, the third motor 61 is connected with a third rotating shaft, and a motion state of the third motor 61 is controlled by the third motor control circuit 62. As the third rotating shaft is driven to rotate by the third motor 61, the clamping portion 3 is driven to perform rolling movement in the space.

The first motor 41, the second motor 51 and the third motor 61 may be brushless motors which have advantages such as servo control, frequency stepless speed control and lower cost when compared with the brush motor. The first rotating shaft, the second rotating shaft and the third rotating shaft are all hollow shafts, in which a slip ring is arranged, such that electrical wires of the driving motors will not be rotated along with the driving motors and thus the intertwist of the wires can be avoided.

Referring to FIG. 1, the clamping portion 3 in the present embodiment comprises a clamping plate 32 and a clamping piece 31 arranged on two sides of the clamping plate 32. One end of the clamping piece 31 is fixedly connected with the clamping plate 32, and the other end is sleeve-arranged with a resilient member and is telescopically inserted in the clamping plate 32. With the configuration of the clamping portion 3, a space for holding the photographic equipment is provided to facilitating the clamping and fixing of the photographic equipment.

Figure 5:
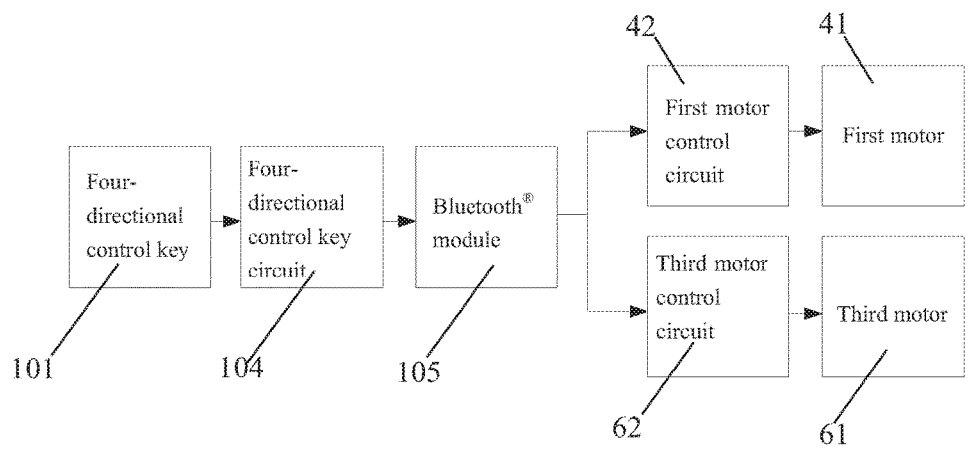
FIG. 5 is a first schematic diagram of a control system of a telescopic stabilizer according to an embodiment of the present invention.

Referring to FIGS. 1 and 5, the handle 1 in the present embodiment is arranged with a button panel 100. A four-directional control key 101 is arranged on the button panel 100, and a four-directional control key circuit 104 and a Bluetooth® module 105 is arranged inside the button panel 100. Due to the four-directional control key 101 and the four-directional control key circuit 104, the motion states of the first motor 41 and the third motor 61 can be controlled, and thus the yawing movement of the first motor 41 and the rolling movement of the third motor 61 of the stabilizer can be controlled. The four-directional control key 101 is electrically connected with the four-directional control key circuit 104, such that inductive signals input through the four-directional control key 101 can be detected by the four-directional control key circuit 104 and converted into the input signals that can be processed by the four-directional control key circuit 104. The four-directional control key circuit 104 is electrically connected with the Bluetooth® module 105. By means of the Bluetooth® module 105, the input signals received from the four-directional control key circuit 104 can be identified, and then command signals can be sent to control the first motor 41 to perform yawing movement and control the third motor 61 to perform rolling movement. The Bluetooth® module 105 is electrically connected with the first motor control circuit 42 and the third motor control circuit 62, respectively. By means of the first motor control circuit 42 and the third motor control circuit 62, the signals sent from the Bluetooth® module 105 can be received and processed, the movement trends of the first motor 41 and the third motor 61 can be estimated and predicted, and finally control instructions can be output to the first motor 41 and the third motor 61 so as to adjust the motion states of the first motor 41 and the third motor 61, whereby the motion states of the first rotating shaft and the third rotating shaft can be changed.

Figure 6:
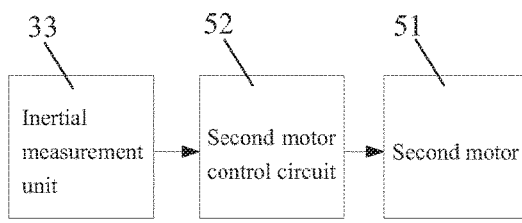
FIG. 6 is a second schematic diagram of a control system of a telescopic stabilizer according to an embodiment of the present invention.

Referring to FIGS. 1 and 6, the clamping portion 3 in the present embodiment is arranged with an inertial measurement unit 33 electrically connected with the second motor control circuit 52. By means of the inertial measurement unit 33, the motion information including angular velocity information and acceleration information of the target object positioned on the clamping portion 3 can be detected, and the detected angular velocity information and acceleration information can be resolved to obtain position information of the target object. The resolved position information can be sent to the second motor control circuit 52 by the inertial measurement unit 33 and processed by the second motor control circuit 52 to obtain control increments of the angular velocity and acceleration of the target object, and then the control increments can be fed back to the second motor 51 so as to allow an adjustment of the motion state of the second motor 51.

Referring to FIG. 2, the handle 1 in the present embodiment has a hollow interior divided into a first cavity 11 and a second cavity 12, between which a partition plate 13 is arranged. With the hollow structure of the handle 1, the weight can be reduced and meanwhile the space can be fully utilized.

In the present embodiment, the outermost telescopic rod is inserted and sleeved inside the first cavity 11 without affecting the function and mechanism of the handle 1, as shown in FIG. 2. In this way, the telescopic device 2 takes up a smaller space. A battery compartment and a battery disposed inside the battery compartment are arranged inside the second cavity 12, so that both the telescopic rod and the battery can be better protected.

In the present embodiment, a fixing device 14 for fixing the end of the outermost telescopic rod is arranged on a side of the partition plate 13 facing the first cavity 11, as shown in FIG. 2. The fixing device 14 is a fixed block. Due to the fixed block, the outermost telescopic rod can be fixed and prevented from falling out of the handle 1.

Referring to FIG. 1, a functional key 102 and a camera button 103 are further provided on the button panel 100 in the present embodiment. The stabilizer can be switched between different working modes by means of the functional key 102. The camera button 103 can be used in a photo mode and a video mode.

Referring to FIGS. 5 and 6, a control method of a telescopic stabilizer in the present embodiment comprises steps as follows:

S1. If a change for a state of yawing movement of the first motor 41 and a state of rolling movement of the third motor 61 is required, pressing down any one or more of an up, down, left, right direction keys of the four-directional control key 101, electrically connecting the output end of the circuit of the four-directional control key 101 with the input end of the circuit of the four-directional control key 101; collecting direction control signals of the four-directional control key 101 in real time by means of the four-directional control key circuit 104; and converting the direction control signals into direction control input signals that can be processed by the four-directional control key circuit 104.

S2. Sending the direction control input signals to the Bluetooth® module 105 by means of the four-directional control key circuit 104; calculating command signals for changing the motion states of the first motor 41 and the third motor 61 on the basis of the collected direction control input signals and sending the command signals for changing the motion states of the first motor 41 and the third motor 61 to the control circuit of the first motor 41 and the control circuit of the third motor 61 by means of the Bluetooth® module 105, wherein the motion state command signals may be some angle offsets for the first motor 41 and the third motor 61; by means of the Bluetooth® module 105, analyzing signals output from the circuit of the four-directional control key 101 on the basis of the information received from the circuit of the four-directional control key 101, and outputting command signals for changing the angles of the first motor 41 and the third motor 61 to the control circuit of the first motor 41 and the control circuit of the third motor 61.

S3. Processing the control signals sent from the Bluetooth® module 105 and outputting control signals for the first motor 41 to control yawing movement of the first motor 41 by means of the first motor control circuit 42; processing the control signals sent from the Bluetooth® module 105 and outputting control signals for the third motor 61 to control rolling movement of the third motor 61 by means of the control circuit of the third motor 61; processing the control signals sent from the Bluetooth® module 105 by means of the control circuit of the first motor 41 and the control circuit of the third motor 61, to respectively obtain yawing angle offset and rolling angle offset.

S4. As the motion states of the first motor 41 and the third motor 61 change, detecting motion state information of the target object and resolving the detected motion state information of the target object by means of the inertial measurement unit 33 to obtain position information of the target object, wherein the inertial measurement unit 33 comprises a gyroscope used for detecting angular velocity signals of the target object moved in the three-dimensional space and an accelerometer used for detecting acceleration signals of the target object moved in the three-dimensional space, and each of the gyroscope and the accelerometer has an output end connected with the input end of the second motor control circuit 52.

S5. Sending the position information of the target object to the second motor control circuit 52 by means of the inertial measurement unit, performing PID calculation and processing the received position information by means of the second motor control circuit 52 to obtain control increments of the angular velocity and acceleration of the target object.

S6. Feeding back the control increments of the angular velocity and acceleration of the target object by means of the second motor control circuit 52, to control pitching movement of the second motor 51 and thus control the motion state of the target object and provide timely revise of the motion state.

With the above mentioned method, a control of the direction and the stability of the stabilizer can be achieved, and a stable shooting can be provided by the extended or contracted stabilizer.

All the above are merely some preferred embodiments of the present invention. It should be noted that, those skilled in the art may change or modify the above disclosed technical contents to obtain equivalent embodiments without departing from the scope of the present invention.

The invention claimed is:

1. A telescopic stabilizer, characterized in that: it comprises a handle, a telescopic device, a clamping portion, a first connecting rod, a second connecting rod and a third connecting rod, wherein the telescopic device has two ends respectively connected with the handle and a first driving mechanism used for driving the clamping portion to perform yawing movement, the first connecting rod has two ends respectively connected with the first driving mechanism and a third driving mechanism used for driving the clamping portion to perform rolling movement, the third connecting rod has two ends respectively connected with the third driving mechanism and a second driving mechanism used for driving the clamping portion to perform pitching movement, and the second driving mechanism is connected with the clamping portion by the second connecting rod, wherein the telescopic device comprises at least two telescopic rods which are inserted, sleeved and connected successively, wherein an outermost telescopic rod is fixedly connected with the handle, and an innermost telescopic rod is fixedly connected with the first driving mechanism, two adjacent telescopic rods are connected by a stop collar, wherein one of the two adjacent telescopic rods is provided with a locking hole, the stop collar is arranged at its lower part with a protrusion which is fitted with the locking hole and capable of being engaged with the locking hole, and a lower part of the another telescopic rod is fixedly sleeved at the stop collar, wherein each of the telescopic rods is arranged at its lower part with an arc-shaped press-on piece, and the arc-shaped press-on piece is disposed symmetrically on both sides of each telescopic rod, and wherein the protrusion fitted with the locking hole has one end connected with a spring, during an extension of the telescopic device, the spring is in a compressed state; when the interior telescopic rod is stretched out to reach a maximal length, the protrusion is engaged with the locking hole and is exposed outside the locking hole such that the spring is in an extended state and the telescopic rod is in a fixed state, during a contraction of the telescopic device, the spring is in a compressed state, when the interior telescopic rod is drawn back to the retracted position at the end, the whole telescopic device is in a contracted state.

2. The telescopic stabilizer according to claim 1, characterized in that: the telescopic device comprises a first telescopic rod, a second telescopic rod, a third telescopic rod, a fourth telescopic rod and a fifth telescopic rod, which are successively inserted and sleeved, wherein one end of the first telescopic rod is fixedly connected with the first driving mechanism, and the fifth telescopic rod is inserted inside the handle.

3. The telescopic stabilizer according to claim 1, characterized in that: the first driving mechanism comprises a first motor and a first motor control circuit which are electrically connected, the second driving mechanism comprises a second motor and a second motor control circuit which are electrically connected, and the third driving mechanism comprises a third motor and a third motor control circuit which are electrically connected.

4. The telescopic stabilizer according to claim 3, characterized in that: the handle is arranged with a button panel, on which a four-directional control key is arranged, and a four-directional control key circuit and a Bluetooth® module is arranged in the button panel, wherein the four-directional control key is electrically connected with the four-directional control key circuit, the four-directional control key circuit is electrically connected with the Bluetooth® module, and the Bluetooth® module is electrically connected with the first motor control circuit and the third motor control circuit respectively.

5. The telescopic stabilizer according to claim 3, characterized in that: the clamping portion is arranged with an inertial measurement unit electrically connected with the second motor control circuit.

6. The telescopic stabilizer according to claim 1, characterized in that: an inside of the handle is divided into a first cavity and a second cavity, between which a partition plate is arranged.

7. The telescopic stabilizer according to claim 6, characterized in that: the outermost telescopic rod is inserted and sleeved inside the first cavity, and a battery compartment and a battery disposed inside the battery compartment are arranged inside the second cavity.

8. The telescopic stabilizer according to claim 7, characterized in that: a fixing device for fixing an end of the outermost telescopic rod is arranged on a side of the partition plate facing the first cavity.

9. A control method of a telescopic stabilizer according to claim 1, characterized in that: it comprises steps of:

by means of a four-directional control key circuit, collecting a direction control signal of a four-directional control key in real time, and converting the direction control signal into a direction control input signal that can be processed by the four-directional control key circuit;

sending the direction control input signal to a Bluetooth® module by means of the four-directional control key circuit; by means of the Bluetooth® module, calculating a command signal for changing a movement angle and a movement trend of a first motor and a third motor on the basis of the collected direction control input signal, and sending the command signal for changing a movement angle and a movement trend of a first motor and a third motor to a first motor control circuit and a third motor control circuit;

by means of the first motor control circuit, processing the control signal sent from the Bluetooth® module and outputting a control signal of the first motor to control yawing movement of the first motor, and by means of the third motor control circuit, processing the control signal sent from the Bluetooth® module and outputting a control signal of the third motor to control rolling movement of the third motor;

by means of an inertial measurement unit, detecting angular velocity information and acceleration information of a target object after a change of a motion state of the first motor and the third motor, and resolving the detected angular velocity information and acceleration information to obtain position information of the target object;

sending the position information of the target object to a second motor control circuit by means of the inertial measurement unit, processing the received position information by means of the second motor control circuit to obtain a control increment of angular velocity and acceleration of the target object;

feeding back the control increment of angular velocity and acceleration of the target object by means of the second motor control circuit to control pitching movement of the second motor.

* * * * *